United States Patent [19]
Jenkins

[11] Patent Number: 4,912,815
[45] Date of Patent: Apr. 3, 1990

[54] CLAMP ASSEMBLY

[75] Inventor: Peter D. Jenkins, Woodbridge, England

[73] Assignee: British Telecommunications public limited company, United Kingdom

[21] Appl. No.: 124,111

[22] PCT Filed: Jan. 19, 1987

[86] PCT No.: PCT/GB87/00032

§ 371 Date: Sep. 10, 1987

§ 102(e) Date: Sep. 10, 1987

[87] PCT Pub. No.: WO87/04573

PCT Pub. Date: Jul. 30, 1987

[30] Foreign Application Priority Data

Jan. 20, 1986 [GB] United Kingdom ................ 8601278

[51] Int. Cl.$^4$ ............................................. F16G 11/00
[52] U.S. Cl. ................................ 24/122.3; 24/136 R; 403/248
[58] Field of Search ............... 24/122.3, 122.6, 136 R, 24/503; 403/248, 275, 277, 374

[56] References Cited

U.S. PATENT DOCUMENTS

| | | | |
|---|---|---|---|
| 1,758,218 | 5/1930 | Carlson | 24/122.3 |
| 1,885,316 | 11/1932 | Astley | 24/122.3 |
| 4,127,344 | 11/1978 | Kwiatkowski | 403/275 |
| 4,507,008 | 3/1985 | Adl et al. | 403/275 |
| 4,516,830 | 5/1985 | Guazzo . | |
| 4,598,443 | 7/1986 | Ostling et al. | 24/136 R |

FOREIGN PATENT DOCUMENTS

| | | |
|---|---|---|
| 0120634 | 10/1984 | European Pat. Off. . |
| 516175 | 12/1930 | Fed. Rep. of Germany . |
| 517765 | 1/1931 | Fed. Rep. of Germany . |
| 58-54301 | 6/1983 | Japan . |
| 565393 | 11/1944 | United Kingdom . |
| 666004 | 2/1952 | United Kingdom ................ 24/122.3 |
| 851508 | 10/1960 | United Kingdom . |
| 871697 | 6/1961 | United Kingdom . |
| 2006892 | 5/1979 | United Kingdom . |
| 2026650 | 2/1980 | United Kingdom ................ 403/374 |
| 2122245 | 1/1984 | United Kingdom . |
| 2138218 | 10/1984 | United Kingdom . |

Primary Examiner—Victor N. Sakran
Attorney, Agent, or Firm—Nixon & Vanderhye

[57] ABSTRACT

A clamp assembly for securing the ends of longitudinal tensile load-bearing elements comprises a pair of rings having complementary tapered surfaces. When assembled, one ring seats coaxially inside the other ring and the elements are gripped between the tapered surfaces. The outer, tapered surface of the inner ring is roughened and embedded in the surface of the elements so that load on the elements acts preferentially to draw the inner ring more tightly against the inner, tapered surface of the outer ring. An outer collar engages the outer ring with a flange to retain the assembly. The assembly finds particular application as an armour clamp for a submarine telecommunications cable.

23 Claims, 2 Drawing Sheets

CLAMP ASSEMBLY

The present invention relates to the field of clamp assemblies for securing the ends of longitudinal, tensile load-bearing elements and finds particular application in armour clamps for submarine telecommunications cables.

It is sometimes necessary to secure the ends of longitudinal elements which are required to carry large tensile loads. The means used to secure their ends must be designed to do so without introducing weakness.

Where a submarine telecommunications cable is concerned, tensile load-bearing elements may be present as one or more annular layers of wires, known as armour wires, wound helically along the cable. For example, shallow water telecommunications cables are generally provided with such armour wires for protection against damage by trawlers. These armour wires between them may have to take tensile loads of the order of 100 tons if a trawler should pick up a cable in error. At a repeater housing loads of up to for instance 3 tons may have to be borne by individual wires as the repeater housing is wound onto a cable drum. Hence any clamp assembly used in clamping the ends of the armour wires, known in this context as an armour clamp, must be capable of reliably withstanding total loads on the wires of the order of 100 tons and, if used at a repeater housing, of more than 3 tons on individual wires.

A first known type of armour clamp comprises a pair of coaxial rings. The inner ring has a cylindrical hole but presents a conical exterior, its walls being rounded at their thicker end. The outer ring presents a conical hole, complementary to the exterior of the inner ring. In use, the ends of the armour wires are each fed through the inner ring and bent back over its conical exterior, round the thicker end of its walls. The outer ring is seated on the wires, its conical hole clamping them against the exterior of the inner ring. The outer ring can then be appropriately mounted to anchor the cable as required, for example, to a repeater housing.

This assembly is self-tightening in use. The surface of the conical hole of the outer ring is profiled so as to grip the armour wires while the exterior of the inner ring is smooth. Any tensile load on the armour wires then acts to pull the outer ring towards the thicker end of the inner ring and so tends to increase the clamping effect on the wires themselves, between the two rings. However, unfortunately, the assembly has been found unsatisfactory. The bend produced in each armour wire has led to failure of the clamp owing to shear breakage under unacceptably low tensile loads.

In order to overcome the problem recognised in the above assembly, a second known type of armour clamp is designed to operate without requiring the armour wires to be bent. Such a clamp is described in British patent GB 2122245. In this assembly, a rigid sleeve is inserted under the straight ends of the armour wires. Coaxial rings having complementary conical surfaces are again used but, in this case, both conical surfaces are smooth and the inner ring is in four separate segments, divided along radial planes of the ring.

The segments of the inner ring are mounted on the armour wires over the rigid sleeve, and the outer ring is then mounted over the segments.

In this second type of armour clamp, which is again self-tightening, when tensile load is applied to the armour wires the two rings are loaded such that the inner ring is pulled towards the end of the outer ring having the narrower opening. The segments of the inner ring are thereby clamped more tightly onto the armour wires, against the rigid internal sleeve.

Although the second type of armour clamp has been found to offer acceptable reliability at loads of up to 82 tons on the armour wires, it also has drawbacks, including cost, owing to the number of components involved, and the need to insert the rigid sleeve under the straight ends of the armour wires. This means that the diameter of parts of the cable which lie within the armour wires must be reduced to give access for the rigid sleeve.

A further problem, common to known forms of armour clamp particularly for submarine cables is related to the techniques required for their installation.

Conventionally, such clamps are mounted, and the clamping forces provided, by a circumferential ring of bolts. Initially, the practice is to tighten these bolts evenly to a controlled maximum tension, selected according to the load expected in use. The clamp components are thereby settled-in and the likely extent of any movements in the clamp components when in use is consequently reduced.

However, it is known that to maintain the cable armour under such maximal stress can lead to accelerated local deterioration of the armour, particularly from salt water corrosion, for example. Therefore, the tension is normally relieved by subsequently loosening the bolts and then retightening them to a final installation tension slightly lower than the original maximum applied tension. This two-stage mounting process, requiring balanced tightening of the bolts using a torque wrench, is clearly laborious and time-consuming.

An object of the present invention is to provide a clamp assembly which overcomes or at least mitigates the aforementioned disadvantages, which is relatively simple to manufacture and install and which is reliable in use.

A further object of the present invention is to provide a novel installation method for the clamp.

In spite of the large tensile loads which can be involved, and which submarine cables are designed to withstand, it has now been found that an armour clamp can be made which, although requiring the armour wires to be bent, in this case by introducing a slight flaring at the clamp, exhibits satisfactory load bearing properties.

According to the present invention there is provided a clamp assembly, for securing the ends of an annulus of longitudinal, tensile load-bearing elements, comprising a pair of rings, a first of which has a tapered outer surface and a second of which has a complementary, tapered inner surface, the tapered outer surface of the first ring being roughened so as to enhance its grip on the load bearing elements in use, the load-bearing elements being disposed between the complementary tapered surfaces.

When assembled, the tapered surfaces present a tapered interface between the rings. In use, the second ring is secured and acts as a stop for the first ring. The end portions of the longitudinal elements are flared apart, being gripped between the tapered surfaces of the rings, at the interface. Tensile load on the elements acts to draw the first ring more tightly against the second ring, so increasing the grip of the rings on the armour wires.

Clamp assemblies according to embodiments of the present invention have the advantage that they are simple in design, being based on just a pair of rings.

In an armour clamp for a submarine telecommunications cable, according to an embodiment of the present invention, it is preferable that the angle included by the tapered surface of each respective ring, in any axial cross section of the ring, A, lies in the range 10° to 35° inclusive. More preferably the angle is not more than 25°. An angle of around 20° has been found particularly preferable.

In a particularly simple form, the tapered surfaces of such an armour clamp are conical.

Conveniently, the roughened outer surface of the first ring comprises circumferential corrugations. The corrugations may have a saw tooth profile and may, for example, comprise a thread on the surface. Preferably, the saw tooth profile is asymmetric, with one side inclined substantially more steeply relative to the plane of the tapered surface than the other, the steeper side facing towards the wider end of the tapered surface.

For cables such as submarine cables or the like, preferably the corrugations have a depth in the range from 0.2 mm to 2 mm inclusive, and a pitch in the range from 0.2 mm to 5 mm inclusive.

Where an assembly according to an embodiment of the present invention is used as an armour clamp for a submarine telecommunications cable it has particular advantages. Firstly, there is no need to reduce the diameter of the cable within the armour wires in order to install the clamp. Secondly, where the armour clamp is installed, for instance at a cable joint or termination, it is possible to position the clamp unusually close to the cable joint or termination. This is because the armour wires are flared at the clamp; the clamp can then easily be designed to present a flared opening to the tapered end of the cable joint or termination such that the end of the cable joint or termination can be received within the armour clamp. This close positioning reduces the rigid length of a cable joint or termination, which in turn reduces the effect of bending strains imposed, for instance, when a cable is wound on a cable drum.

Further, where the assembly is an armour clamp it has the advantage that it can easily be designed to accept multiple layer armouring. This can be achieved by merely adding further rings to the assembly so that the assembly presents more than one tapered interface. One set of armour wires can then be received and gripped at each interface.

According to a preferred embodiment of the present invention, the clamp assembly includes securing means, for anchoring the assembly to a terminating member. The securing means preferably comprises a collar having a threaded portion and an internal substantially annular abutment surface. The second ring is provided with a substantially annular shoulder adapted to mate with the abutment surface when the ring is mounted in the collar, the shoulder being at that end of the second ring having the narrower inner surface diameter. The collar is mounted by means of the threaded portion onto a complementary threaded portion provided on the terminating member. The abutment surface acts to retain the second ring, so securing the clamp assembly to the terminating member, which itself may conveniently comprise a repeater or terminal housing, for example.

Preferably, the end of the second ring having the shoulder portion is also provided with a surface to which external pressure may be applied during installation of the clamp on the load bearing elements. Conveniently, this surface is orthogonal to the axis of the ring, and is not enclosed by the collar. Most preferably the surface is annular to permit pressure to be applied evenly on the ring and on the load bearing elements.

This feature is particularly advantageous in that it permits the clamp to be installed without requiring a circumferential ring of retaining bolts. The initial clamping force for embedding the clamp components can be applied with ease, using a hydraulic press, for example, and the collar can then be tightened whilst the clamp is under pressure.

Since the initial clamping force does not have to be applied by directly tightening up the collar, the threads in the collar do not need to be designed to torque to a high force but only to withstand the applied stresses under static conditions. In these circumstances, the inventor has found that after the collar is tightened and the initially applied clamping pressure is released, there is a slight distortion of the thread connection between the collar and the termination member which results in a relaxation of the stress on the clamped load bearing members. Advantageously, the lowering of stress provided by the thread distortion is sufficient to obviate the need for the loosening and retightening steps required when mounting the prior art clamps.

Clamp assemblies according to the preferred embodiment are particularly advantageous as armour clamps because they can be installed with such relative ease and with little risk of failure under the heavy loads involved.

The installation method is likewise particularly advantageous for mounting cable clamps on submarine cables, where the operating requirements can be uniquely extremely severe, owing to the high tensile loads which the cable clamp must be able to withstand.

Accordingly, in a further aspect of the present invention, a method of mounting a clamping assembly according to the invention for securing the ends of an annulus of longitudinal, tensile load-bearing elements to a termination member comprises the steps of:

positioning the ends of the load bearing elements around and over the outer tapered surface of the first ring;

attaching the first ring to the termination member;

positioning the second ring over the load bearing elements and the first ring;

sliding the collar over the second ring and coupling the collar to the terminating member;

applying pressure to the appropriate surface of the second ring, thereby to embed the clamp components and to cause the roughened surface of the first ring to bite into the load bearing elements;

tightening the collar whilst the pressure is applied to the second ring, and thereafter releasing the applied pressure.

Conveniently, the embedding pressure is applied gradually up to a maximum appropriate to the tensile strength of the load bearing elements and according to the relevant performance requirements for the clamp, and the collar is tightened correspondingly, to the extent that when the embedding pressure on the second ring is finally released the stress maintained on the load bearing elements by the tightened collar is slightly below the previously applied maximum. The desired stress relief, mentioned above, is thereby easily achieved.

Armour clamps and the installation thereof according to the present invention will now be described, by way of example only, with reference to the accompanying drawings in which.

Figure 1:
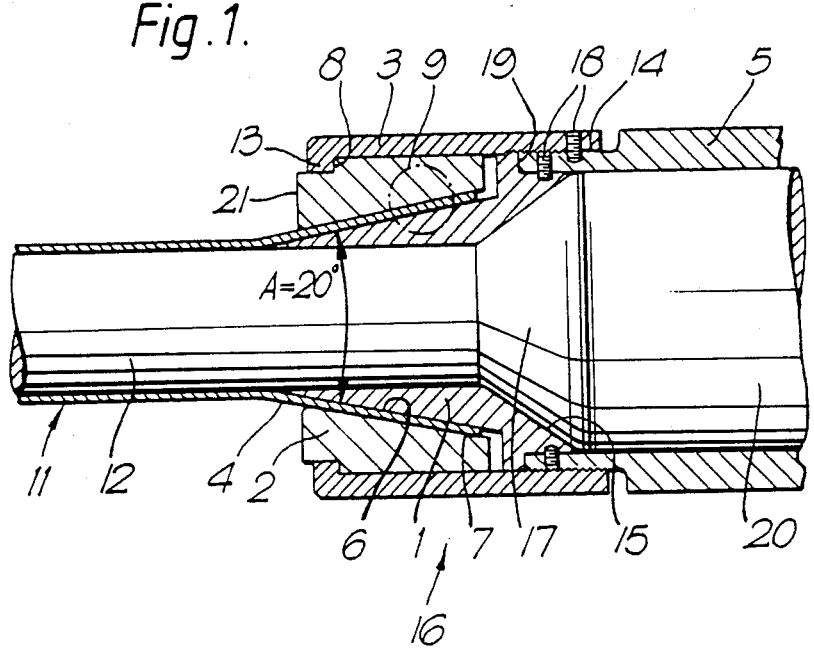
FIG. 1 is a cross-sectional representation of an armour clamp, according to the invention, for single-armoured submarine telecommunications cable, shown installed at a cable joint.

Referring to FIG. 1, a single-armoured submarine cable 11 to be terminated using the armour clamp comprises a central core 12 protected by armour wires 4. The core 12 includes such elements as optical fibres for signal transmission, an electrical conductor to power repeaters on the cable, high tensile steel wires and a polythene protective coating. The illustrated cable is a 26 mm A70 submarine cable as supplied by Standard Telephones and Cables plc, UK. This cable has a central core diameter of circa 26 mm with a single annular layer 4 of high tensile steel armour wires. The wires are 1SWG (Standard Wire Guage), 0.762 mm in diameter, with a nominal tensile strength of 70 hectobars. The wires are laid adjacent each other in steeply pitched helices on the outer surface of the polythene coating of the core 12. (The armour wires 4 are represented in the figures as being straight rather than helically laid for convenience only).

At a cable joint 16, the central core 12 is jointed, in core joint 20, which is protected by a cylindrical housing 5. (The core joint 20 and the housing 5 are only partially shown in FIG. 1). The armour wires 4 are terminated at one side of the core joint 20 in an armour clamp 1, 2, 3, which encompasses the central core 12. The armour clamp 1, 2, 3 is mounted on the end of the housing 5 and the central core 12 extends beyond the armour wires, to meet the tapered end 17 of the core joint 20.

The armour clamp comprises two rings 1, 2 and a securing collar 3. The armour wires 4 of the cable extend between the rings 1, 2, being gripped thereby. The collar 3 secures the rings 1, 2 to the housing 5 protecting the core joint 20.

The two rings 1, 2 are mounted coaxially, one inside the other. The first ring 1 has a conically tapered outer surface 6 and the second ring 2 has a complementary tapered inner surface 7.

The outer surface 6 of the first ring 1 is roughened, having a zig-zag profile in the axial direction of the ring 1. This profile is embedded in the armour wires 4 of the cable. The inner surface 7 of the second ring 2 is smooth.

Figure 2:
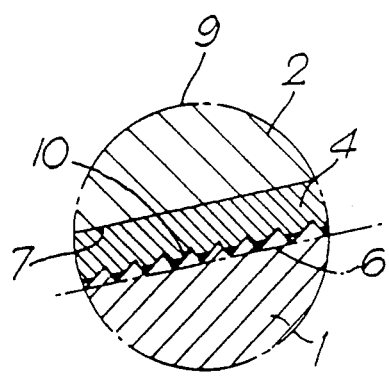
FIG. 2 shows (a) detail of the armour clamp of FIG. 1, and (b) detail of the roughened surface of the first ring, both on an enlarged scale.
Figure 2:
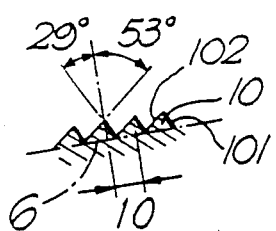

FIG. 2(a) shows in more detail (not to any exact scale) the circled region 9 of FIG. 1. FIG. 2(b) illustrates characteristics of the zig-zag profile of the outer surface 6 of the first ring 1. Each tooth 10 of the profile is asymmetric, having one side 101 inclined substantially more steeply relative to the plane of the outer surface 6 of the ring 1. The steeper side 101 of each tooth 10 faces towards the core joint 20, and away from the narrower end of the ring 1. As shown, in this embodiment, the steeper side 101 of each tooth 10 is inclined at 61° relative to the plane (29° to the normal), whilst the less steep side 102 is inclined at 37° to the plane (53° to the normal). The pitch of the teeth 10 is 1 mm and the depth is 0.5 mm.

The details of design of the teeth 10 are not essential features but it must be borne in mind that there is a trade-off between the enhanced grip on the armour wires 4 achieved by increasing the depth to which the teeth 10 embed themselves in the wires 4, and the accompanying reduction in tensile strength of the wires 4 which may occur.

Returning to FIG. 1, the two rings 1, 2 are separated by substantially the thickness of the individual armour wires 4. The angle A included between the tapered surfaces 6, 7 of each respective ring 1, 2 is 20°, the surfaces 6, 7 being arranged symmetrically about the axis of the rings 1, 2.

Although it is not essential that the angle A should be 20°, it is preferable that it lies within the range 10° to 35° inclusive, and more preferably in the range 10° to 25° inclusive. This is at least partly because it gives a good relationship between the following factors:

i. the extent to which, in use, the tensile strength of the armour wires 4 is reduced by bending; and ii. the relative axial movement between the two rings 1, 2 required to embed the zig-zag profile of the outer surface 6 of the first ring 1 in the armour wires 4 to the depth required, during installation. (Further details of installation are given below).

The second ring 2 is provided with a shoulder 8, 20 mm deep in an axial direction relative to the ring. The shoulder 8 is provided around the circumference of that end of ring 2 having the narrower diameter opening, and which faces away from the core joint 20 when installed.

The securing collar 3 is mounted on the end of the housing 5 by means of a screw thread 14. The collar 3 secures the rings 1, 2 to the housing 5 by means of an internal flange 13, 17 mm deep in an axial direction relative to the rings 1, 2. The flange 13 abuts the shoulder 8 of the second ring 2. Part of the shoulder 8, and the end surface 21 of the ring 2, therefore protrude by 3 mm from the end of the collar 3. This is convenient for installation of the clamp as described in more detail below.

The second ring 2 acts as a stop, retaining the first ring 1 by virtue of the complementary tapered surfaces 6, 7. Grub screws 18 prevent rotation of the collar 3 and first ring 1 relative to the core joint 20 and to each other, in use.

The internal surface 15 of the first ring 7 is also tapered, in a direction substantially parallel to its outer surface 6. In this case, the tapering is designed to accommodate the tapered end 17 of the core joint 20, allowing the armour clamp 1, 2, 3 to lie comparatively close to the core joint 20. The first ring 1 is further provided with an abutment surface 19 which seats against the end of the housing 5.

The major components of the armour clamp 1, 2, 3 are constructed out of hardened sherardised steel.

Figure 4:
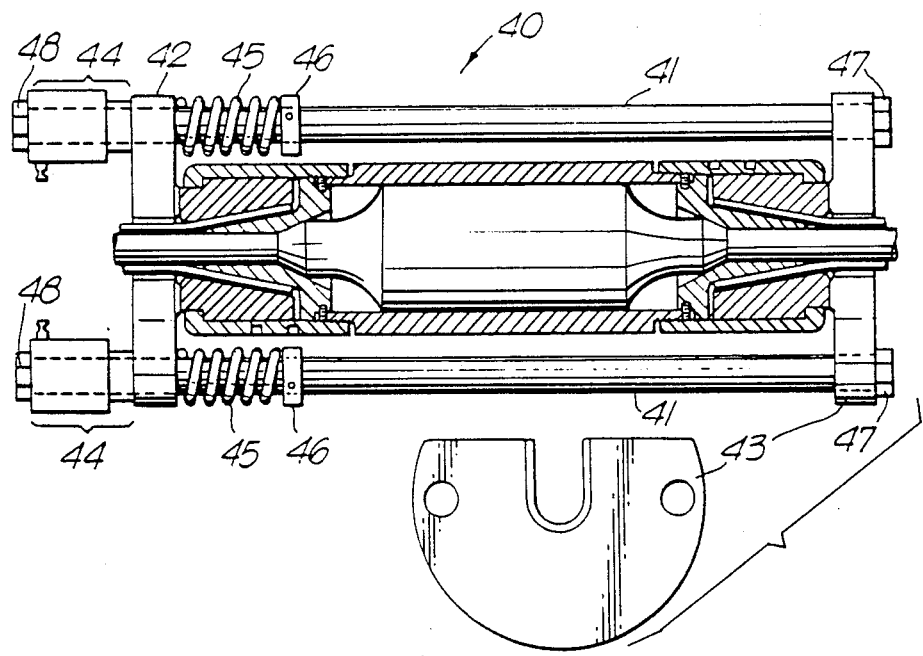
FIG. 4 illustrates schematically in plan view and partial section the apparatus and technique used when installing armour clamps as shown in FIG. 1 at a repeater housing.

Referring to FIG. 4, a method and apparatus for installing the armour clamp 1, 2, 3 is now described. FIG. 4 shows two of the clamps illustrated in FIG. 1 on a repeater housing. Both clamps may be installed at the same time, but for simplicity the following discussion relates to the assembly of one clamp only.

Firstly, the collar 3 and outer ring 2 of the clamp are threaded loosely onto the cable 11. The first ring 1 is then brought into position, seated by means of the abutment surface 19 against the housing 5 and retained in position by the appropriate grub screws 18. The central core 12 of the cable 11 is jointed as necessary to produce the core joint 20. The armour wires 4 are laid along the outer tapered surface 6 of the first ring 1 and the second ring 2 is brought up into engagement with the armour wires 4, against that outer surface 6. The collar 3 is screw-threaded onto the housing 5 so as to hold the rings 1, 2 and armour wires 4 in position by means of contact between the in-turned flange 13 and the shoulder 8 on the second ring 2. A hydraulic press 40 is used to apply a force to the protruding surface 21 of the second ring 2, compressing the rings 1, 2, via the abutment surface 19 of the first ring 1, against the housing 5. The force exerted by the press, is sufficient to cause the roughened outer surface 6 of the first ring 1 to bite into the armour wires 4 to the full depth of the teeth 10. The screw thread of the collar 3 is then tightened onto the housing 5 until the in-turned flange 13 of the collar 3 again abuts the shoulder 8 of the second ring 2. Once the collar 3 is in position, the hydraulic press is removed.

The force applied by the press 40 is applied by means of thrust plates 42, 43 which ensure that the force is distributed substantially evenly around the second ring 2. This is to prevent distortion of the rings 1, 2 occurring. It is also to ensure an even distribution of the bite of the teeth 10 of the first ring 1 into the armour wires 4.

As shown, the thrust plates 42, 43 are slotted rings to permit the cable, housing and clamp assembly to be easily and centrally positioned in the press 40. It will be appreciated that so long as the thrust plates allow the pressure to be distributed substantially evenly around the ring 2, their precise design is not critical.

The thrust plates 42, 43 are carried on a pair of parallel tie rods 41. One of the plates 43 is positioned at one end of the tie rods 41 and held on by retainers 47. At the opposite end of each tie rod 41, a hydraulic ram 44, held on by retainers 48, is placed to act directly on the second thrust plate 42. A return spring 45, positioned by a stop 46 is provided on each tie rod to act against the second thrust plate 41 to return the plate and the rams to an equilibrium position after the ram pressure used to embed the clamp(s) has been released. In practice, the components of the press 40 illustrated are themselves conveniently supported on a suitable frame (not shown).

As an example, to install a clamp on the aforementioned 26 mm A70 cable, the ram pressure on the second ring 2 was increased in 75 bar increments up to a maximum of 450 bar and the collar tightened, after which the pressure was released. This sequence was repeated until the teeth 10 could not be embedded any deeper by further applications of pressure. When the press is removed, the components of the armour clamp 1, 2, 3 take up the force released by the press at least partially by settling into a final configuration. Some of the force is taken up by distrotion of the screw threaded connection between the collar 3 and the housing 5 and some remains in the armour clamp 1, 2, 3. In use, therefore, the armour clamp 1, 2, 3 remains in compression but to a lesser degree than that produced by the press. This technique of installing the armour clamp provides an extremely simple method of exerting a high force to cause the teeth 10 to bite into the armour wires 4, then reducing it to avoid the known damaging effect of leaving components in a highly stressed state in a corrosive environment such as sea water.

Figure 3:
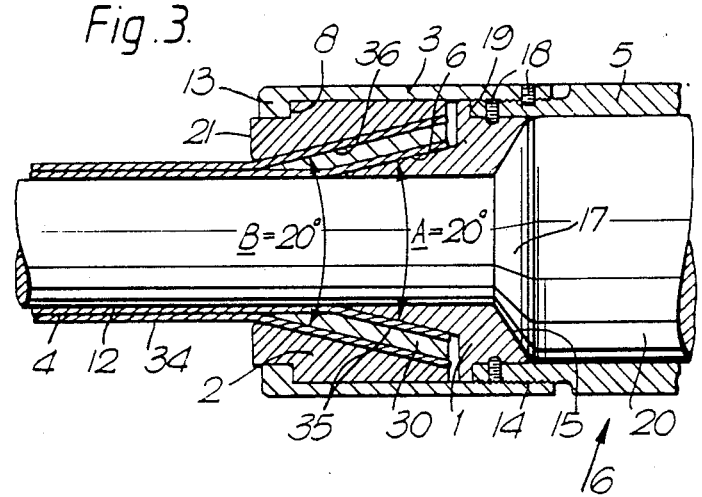
FIG. 3 is a cross-sectional illustration of an armour clamp according to the present invention, adapted for use on a double armoured cable.

Under some circumstances, a submarine cable may be provided with two layers of armour wires. Referring to FIG. 3, in a second embodiment of the present invention, a double layer armour clamp is provided with an additional intermediate ring 30. The additional ring 30 allows the clamp to accommodate the second layer of armour wires 34.

The construction of the double layer armour clamp is the same in principle as for the single layer armour clamp described above with reference to FIG. 1. The first ring 1 lies adjacent the core joint 20. The inner layer of armour wires 4 is laid over this ring as before. However, instead of the second ring 2, the intermediate additional ring 30 is positioned over this first layer 4 of armour wires. The second outer layer 34 of armour wires is then laid over the external tapered surface 36 of the intermediate ring 30. The second ring 2 is then placed over these wires, and the assembly is held in place by the collar 3 as for the single armour clamp.

In this illustrated embodiment, the internal tapered surface 35 of the intermediate ring 30 is smooth, whilst the external tapered surface 36 is roughened with a zig-zag in the same manner as the external surface 6 of the inner ring 1. The intermediate ring 30 is split to allow it to be compressed when the clamp is installed This is not essential, but it is preferable if the clamp components are to be embedded evenly for optimal clamping performance. Again, the included angles, A, B, of the conically tapered surfaces of the rings is 20°.

The double layer armour clamp 1, 2, 30, 3 can be installed at a cable joint in a manner equivalent to the installation of the single layer armour clamp described with reference to FIG. 1.

I claim:

1. A submarine telecommunications cable armour clamp assembly, for securing the ends of an annulus of longitudinal, tensile load-bearing elements, said assembly comprising:
   a pair of rings, a first of which has a tapered out surface and a second of which has a complementary, tapered inner surface,
   the tapered out surface of the first ring being roughened so as to enhance its grip on the load bearing elements in use,
   the tapered inner surface of the second ring being smooth,
   the load-bearing elements being disposed between the complementary tapered surfaces, and
   an annular collar threadably connected to an annular housing and retaining said first and second rings between abutment surfaces of the collar and the housing,
   said second ring including an end surface which extends in a direction away from said housing and beyond said collar abutment surface for application thereto of externally applied clamping forces.

2. A clamp assembly according to claim 1 wherein the roughening of the tapered outer surface takes the form of circumferential corrugations.

3. A clamp assembly according to claim 2, wherein the corrugations have a saw tooth profile.

4. A clamp assembly according to claims 2, or 3, wherein the corrugations have a depth lying in the range 0.2 mm to 2.0 mm inclusive.

5. A clamp assembly according to claims 2, or 3 wherein the corrugations have a pitch lying in the range 0.2 mm to 5 mm inclusive.

6. A clamp assembly according to claim 3 wherein the saw tooth profile is asymmetric, having one side inclined substantially more steeply relative to the plane of the tapered outer surface than the other, the steeper side being the side of the profile towards the wider end of the tapered outer surface.

7. An armour clamp assembly as in claim 1, 2 or 3 wherein:
the angle included by the tapered surface of each respective ring, in any axial cross section of the ring, lies in the range 10° to 35° inclusive.

8. An armour clamp according to claim 7 wherein the angle included by the tapered surface of each respective ring, in any axial cross section of the ring, is not more than 25°.

9. An armour clamp for an armoured submarine cable comprising a clamp assembly according to any one of claims 1 to 3, wherein the internal surface of the first ring is tapered in the same direction as its outer surface.

10. An armour clamp according to claim 7, for securing the ends of two layers of armour wires of the cable, the clamp further comprising:
a third, intermediate ring,
the third ring having a tapered inner surface which is smooth and complementary to the tapered external surface of the first ring, and a tapered outer surface complementary to the tapered internal surface of the second ring,
the outer surface being roughened so as to enhance its grip on the outer of two layers of armour wires in use.

11. An armour clamp according to claim 10, wherein the angle included by the tapered outer surface of the third ring, in any axial cross-section of that ring, lies in the range 10° to 35° inclusive.

12. An armour clamp according to claim 11 wherein the angle included by the tapered outer surface of the third ring, in any axial cross-section of that ring, is not more than 25°.

13. A submarine telecommunications cable amour clamp assembly for securing the ends of an annulus of longitudinal, tensile load-bearing elements, comprising:
a pair of rings, a first of which has a tapered out surface and a second of which has a complementary, tapered inner surface;
the tapered out surface of the first ring being roughened so as to enhance its grip on the load bearing elements in use;
the tapered inner surface of the second ring being smooth;
the load-bearing elements being disposed between the complementary tapered surfaces;
a collar for securing the armour clamp to a terminating member
the collar having a coupling portion which is complementary to a coupling portion on the terminating member and an annular internal abutment surface;
the second ring being provided with an annular shoulder adapted to mate with the abutment surface when the collar is mounted over the ring, the shoulder being directed away from the larger diameter end of the tapered inner surface of the second ring, the arrangement being such that when the collar is mounted on the terminating member, the armour clamp is secured to the terminating member by co-operation between the abutment surface and the shoulder;
the end of the second ring having the shoulder being provided with a surface extending externally of the collar for applying external pressure thereto during installation of the clamp on the load bearing elements.

14. An armour clamp according to claim 13 wherein the said surface on the end of the second ring is substantially annular and orthogonal to the axis of the ring, and is not enclosed by the collar.

15. A method of mounting the armour clamp of claim 13 for securing the ends of an annulus of longitudinal, tensile load-bearing elements to a termination member, said method comprising the steps of:
positioning the ends of the load bearing elements around and over the outer tapered surface of the first ring;
attaching the first ring to the termination member;
positioning the second ring over the load bearing elements and the first ring;
sliding the collar over the second ring and coupling the collar to the terminating member;
applying external pressure to the externally extending surface of the second ring, thereby to embed the clamp components and to cause the roughened surface of the first ring to bite into the load bearing elements;
thereafter tightening the collar while the external pressure is applied to the second ring, and further thereafter releasing the applied external pressure.

16. A method according to claim 15 wherein the external embedding pressure is applied gradually up to a maximum appropriate to the tensile strength of the load bearing elements and according to the relevant performance requirements for the clamp, and the collar is tightened correspondingly, to the extent that when the external embedding pressure on the second ring is finally released, the stress maintained on the load bearing elements by the tightened collar is slightly below the previously applied maximum.

17. A submarine telecommunications cable armour clamp assembly for securing the ends of longitudinal load-bearing cable elements to a housing so as to retain structural integrity and an ability to withstand applied axial cable loads of up to approximately 100 tons while submerged in a marine environment over an extended period of time, said clamp assembly comprising:
an inner first ring having (a) a rough textured outer surface which tapers radially outwardly from a front end towards a rear end for biting engagement with load bearing cable elements, (b) a radially extending rear abutment surface for engagement with a mating stop surface of said housing, and (c) an inner surface which includes a rear portion which also tapers radially outwardly towards said rear end to accommodate an increased diameter cable section thereat;
an outer second ring having (a) an inner surface which tapers radially outwardly from a front end towards a rear end for forcing load bearing cable elements into biting engagement with the underlying rough textured surface of said first ring, (b) a radially extending front abutment surface, and (c) front external clamp surface at the front end of said second ring; and
a collar circumscribing said outer second ring and having (a) threaded engagement with said housing at a rear end, (b) a radially inwardly directed forward abutment surface engaged with said front abutment surface of the second ring for retaining said rings under retention clamp force against said housing with load bearing cable elements clamped therebetween and (c) an aperture through which said front external clamp surface of the second ring is accessible for exerting external clamp forces thereto independent of retention clamp forces exerted on said rings by said collar.

18. A submarine telecommunications cable armour clamp assembly as in claim 17 wherein said front external clamp surface of the second ring extends axially towards its front end beyond its front abutment surface and through and beyond the aperture of said collar.

19. A submarine telecommunications cable armour clamp assembly as in claim 17 further comprising:
at least one intermediate ring having (a) a rough textured outer surface which tapers radially outwardly from a front end towards a rear end for biting engagement with load bearing cable elements, (b) an inner surface which also tapers radially outwardly from the front end towards the rear end for forcing load bearing cable elements into biting engagement with an underlying rough textured surface;
said at least one intermediate ring being disposed between said first and second rings to facilitate the clamping of plural annuli of longitudinal, tensile load-bearing cable elements between mating tapered surface of said rings.

20. A submarine telecommunications cable armour clamp assembly as in claim 17 wherein the inner surface of said second ring member is smooth textured.

21. A submarine telecommunications cable armour clamp assembly as in claim 19 wherein the inner surface of said second and intermediate ring members are both smooth textured.

22. A submarine telecommunication cable armour clamp assembly for securing the ends of axial load bearing cable elements to a housing member, said clamp assembly comprising:
at least two matingly tapered concentric and nested rings retained against said housing member by a collar engaged with said housing member,
said tapered rings being disposed to taper radially outwardly toward said housing member and to clamp said load bearing cable elements between the rings as force is applied thereto towards and against said housing member,
said rings being disposed for slidable movement with respect to one another,
at least one of said rings being accessible through said collar for application of external clamping forces thereto during installation.

23. A submarine telecommunication cable as in claim 22, wherein said collar is threadably engaged at one end with said housing member and has an annular abutment flange at another end engaged with a mating annular shoulder of an outermost one of said rings, said abutment flange serving to retain the outermost of said concentric rings against said housing member.

* * * * *